(12) United States Patent
Donaldson

(10) Patent No.: US 9,131,659 B1
(45) Date of Patent: Sep. 15, 2015

(54) PORTABLE LEASH ANCHOR

(76) Inventor: James D. Donaldson, Edmonton (CA)

(*) Notice: Subject to any disclaimer, the term of this patent is extended or adjusted under 35 U.S.C. 154(b) by 365 days.

(21) Appl. No.: 13/589,223

(22) Filed: Aug. 20, 2012

(51) Int. Cl.
A01K 1/04 (2006.01)

(52) U.S. Cl.
CPC .................................. *A01K 1/04* (2013.01)

(58) Field of Classification Search
CPC ........................................................ A01K 1/04
USPC ................. 119/769–771, 786–788, 791, 795
See application file for complete search history.

(56) References Cited

U.S. PATENT DOCUMENTS

| | | | |
|---|---|---|---|
| 4,976,566 A | 12/1990 | Yeomans | |
| 5,022,351 A | 6/1991 | Daniels | |
| 5,373,814 A * | 12/1994 | Seymour | 119/795 |
| 5,829,392 A * | 11/1998 | Coleman | 119/795 |
| 7,984,697 B2 * | 7/2011 | Grbic | 119/769 |
| 8,186,308 B1 * | 5/2012 | Hluben et al. | 119/676 |
| 2006/0207521 A1 | 9/2006 | Klauck | |
| 2013/0092088 A1 * | 4/2013 | Sharp et al. | 119/61.5 |

OTHER PUBLICATIONS 3M 956 Bondo Double Handle Locking Suction Cup by Dent Puller. Amazon.com http://www.amazon.com/3M-956-Double-Locking-Suction/dp/B000KXA6HY.

* cited by examiner

*Primary Examiner* — Rob Swiatek
*Assistant Examiner* — Morgan T Barlow
(74) *Attorney, Agent, or Firm* — Robert C. Montgomery; Montgomery Patent and Disign, LP.

(57) ABSTRACT

A portable anchoring device providing a temporary anchoring means for pet leashes includes a round base containing a suction cup, a durable handle, and a clasp to which a dog leash can be attached. The suction cup provides removable attachment to a smooth horizontal or vertical surface via a second handle which pivots to actuate the suction cup and anchor the device.

12 Claims, 9 Drawing Sheets

PORTABLE LEASH ANCHOR

RELATED APPLICATIONS

There are currently no applications co-pending with the present application.

FIELD OF THE INVENTION

The present invention relates generally to animal leash anchors, and in particular, to those which are portable.

BACKGROUND OF THE INVENTION

Restraining pets are a common technique owners use to keep the pet from wandering away. Restraining pets becomes an issue when the owner transports their pet to various locations beyond of their residence. Locating a position to fix the pets leash to an appropriate surface is troublesome.

Various attempts have been made to provide portable leash anchor. Examples of these attempts can be seen by reference to several U.S. patents. U.S. Patent No. 2006/0207521, issued in the name of Klauck, describes a hands-free and portable pet tether.

U.S. Pat. No. 4,796,566, issued in the name of Daniels, describes a portable convertible tethering system with retractable leash.

U.S. Pat. No. 5,022,351, issued in the name of Daniels, describes a portable convertible tethering system with retractable leash.

While these devices fulfill their respective, particular objectives, each of these references suffer from one (1) or more disadvantages. Many such devices are not suited for properly securing the pet. Other devices are not suited for ease of use. Accordingly, there exists a need for a portable leash anchor without the disadvantages as described above. The development of the present invention substantially departs from the conventional solutions and in doing so fulfills this need.

SUMMARY OF THE INVENTION

The inventor has recognized the aforementioned inherent problems and lack in the art and observed that there is a need for a portable leash anchor.

Accordingly, it is an object of the present embodiments of the invention to solve at least one (1) of these problems. The inventor has addressed this need by developing a portable leash anchor provides an anchoring means to pet leashes for constraining a pet.

To achieve the above objectives, it is an object of the present invention to provide a portable leash anchor with comprises a bottom base portion having a suction cup assembly for attachment and removal.

Yet still another object of the present invention is to provide the portable leash anchor with a quick-release clasp.

Yet still another object of the present invention is to provide the portable leash anchor with a pivoting handle and a stationary handle.

Yet still another object of the present invention is to attach the pivoting handle to a center portion of the base to a linear clevis link portion via a first pin.

Yet still another object of the present invention is to protrude the clevis link downwardly through a washer and through the base, in turn being rotatingly connected to an integral attachment feature of the subjacent suction cup via a second pin.

Yet still another object of the present invention is to provide a method of utilizing the device that provides a unique means of procuring a model of the portable leash anchor having a diameter base and suction cup which corresponds to a size and strength of the pet, attaching the portable leash anchor to a smooth surface of a structure by rotating the pivoting handle downwardly against the base, grasping the stationary handle portion of the portable leash anchor with one's hand; pressing said portable leash anchor against said smooth surface, creating a vacuum zone within the suction cup assembly by rotating the pivoting handle upwardly toward the stationary handle until said pivoting handle contacts, releasing the handle portions of the portable leash anchor; affixing a pet's leash onto the clasp, and, benefiting from establishing a suitable and secure connection point for a pet leash at almost any location.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

DESCRIPTIVE KEY 10 portable leash anchor
20 suction cup assembly
22 base
24 suction cup
25 vacuum zone
26 clevis link
28 attachment feature
30 first pin
32 second pin
40 washer
60 pivoting handle
62 cam feature
64 stationary handle
65a first leg
65b second leg
66 spacer 68 aperture
80 ring
82 clasp
100 pet
102 leash
105 structure
110 smooth surface

DETAILED DESCRIPTION OF THE PREFERRED EMBODIMENT

The best mode for carrying out the invention is presented in terms of its preferred embodiment, herein depicted within FIGS. 1 through 9, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
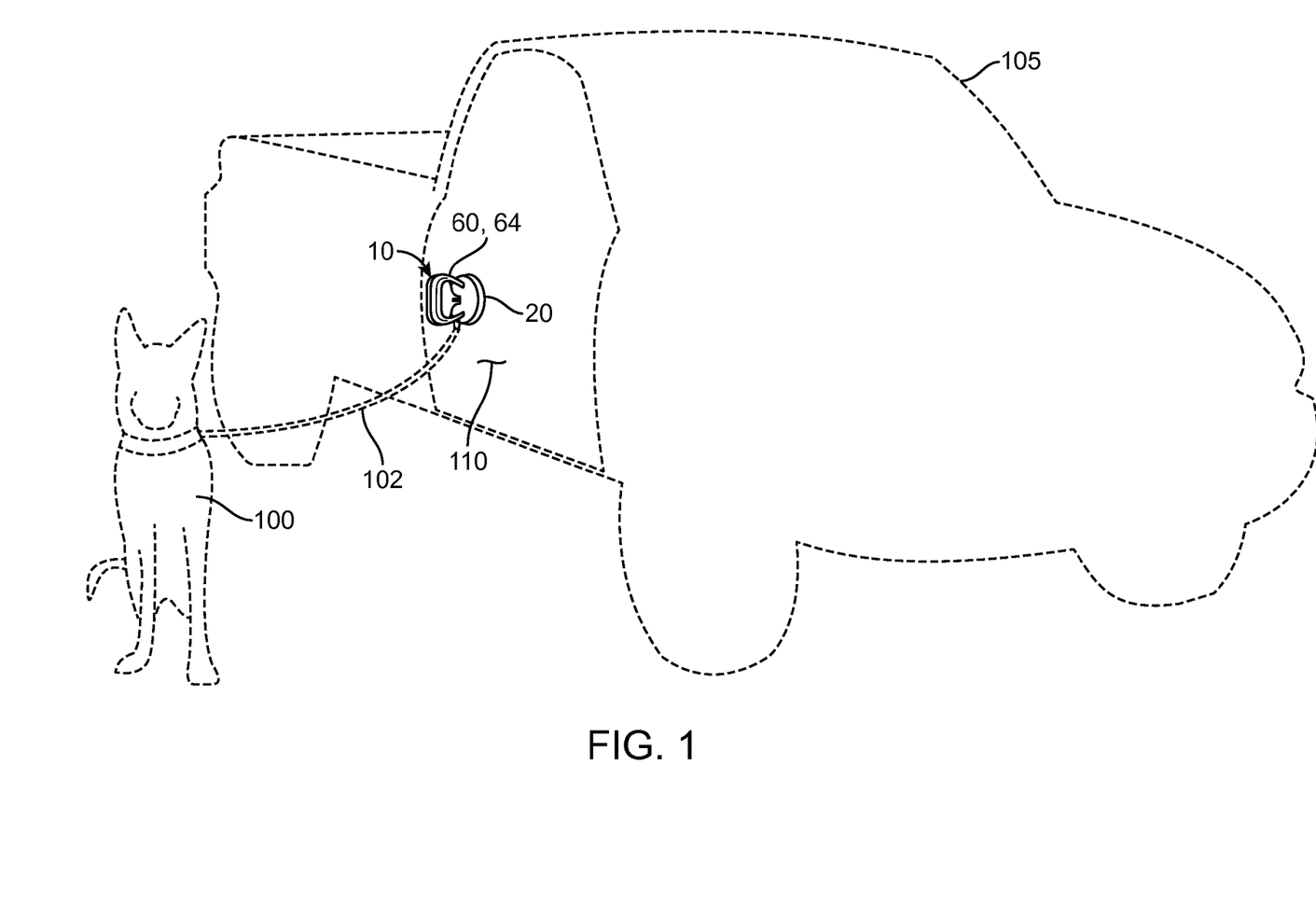
FIG. 1 is an environmental view of a portable leash anchor 10, according to a preferred embodiment of the present invention.

Referring now to FIG. 1, an environmental view of a portable leash anchor (herein described as the "device") 10, according to a preferred embodiment of the present invention, is disclosed. The device 10 provides a temporary anchoring means for use with pet leashes 102 to positionally constrain a pet 100 to a structure 105 such as a vehicle, a building, or the like. The device 10 comprises a bottom base portion 22 which comprises a large suction cup assembly 20 along a bottom surface allowing a user to quickly attach the device 10 to any smooth surface 110. The device 10 also comprises an attached quick release clasp 82 onto which a conventional dog leash 102 may be easily attached. The pet 100 and leash 102 may be attached to the device 10 to assure the pet 100 will stay in place until the user returns. Upon return, the leash 102 can be easily disengaged and the device 10 released from said smooth surface 110 by pivoting a vacuum-releasing handle 60.

Figure 2:
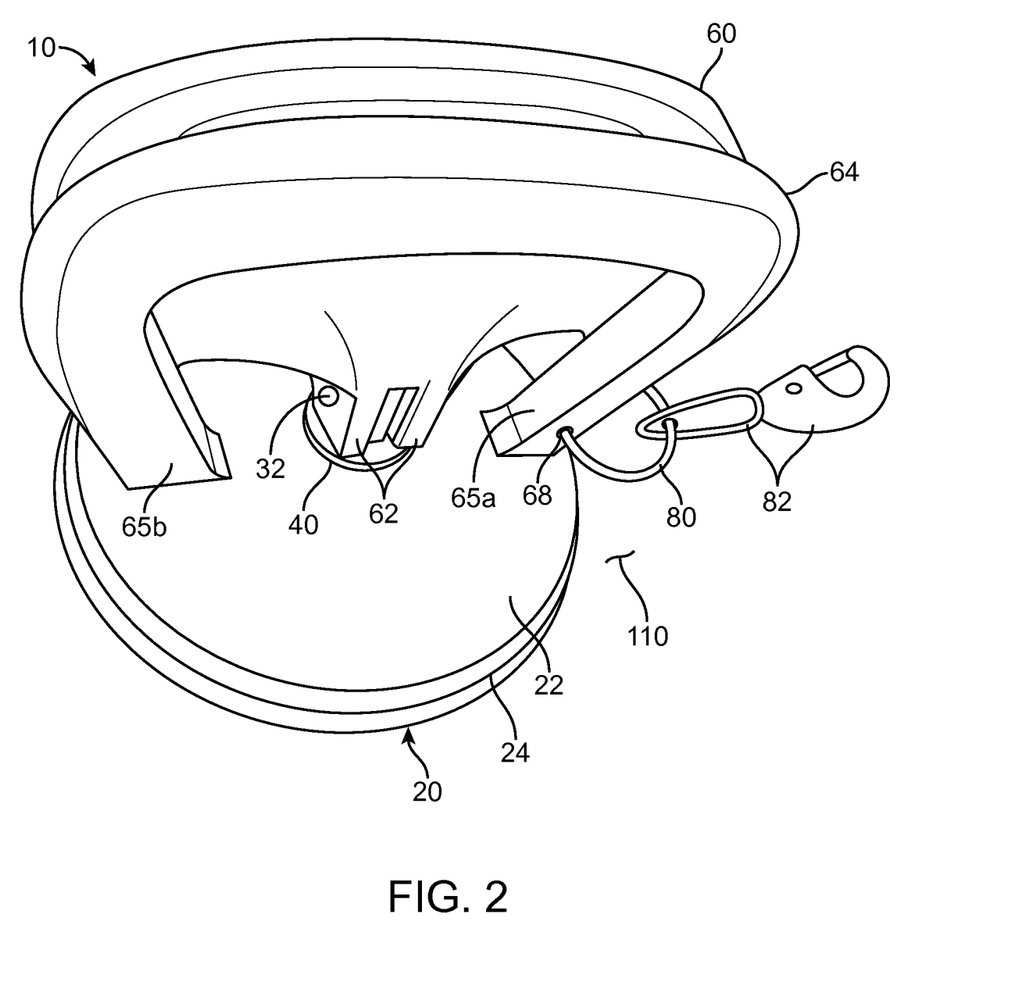
FIG. 2 is a perspective view of the portable leash anchor 10, according to a preferred embodiment of the present invention.
Figure 3:
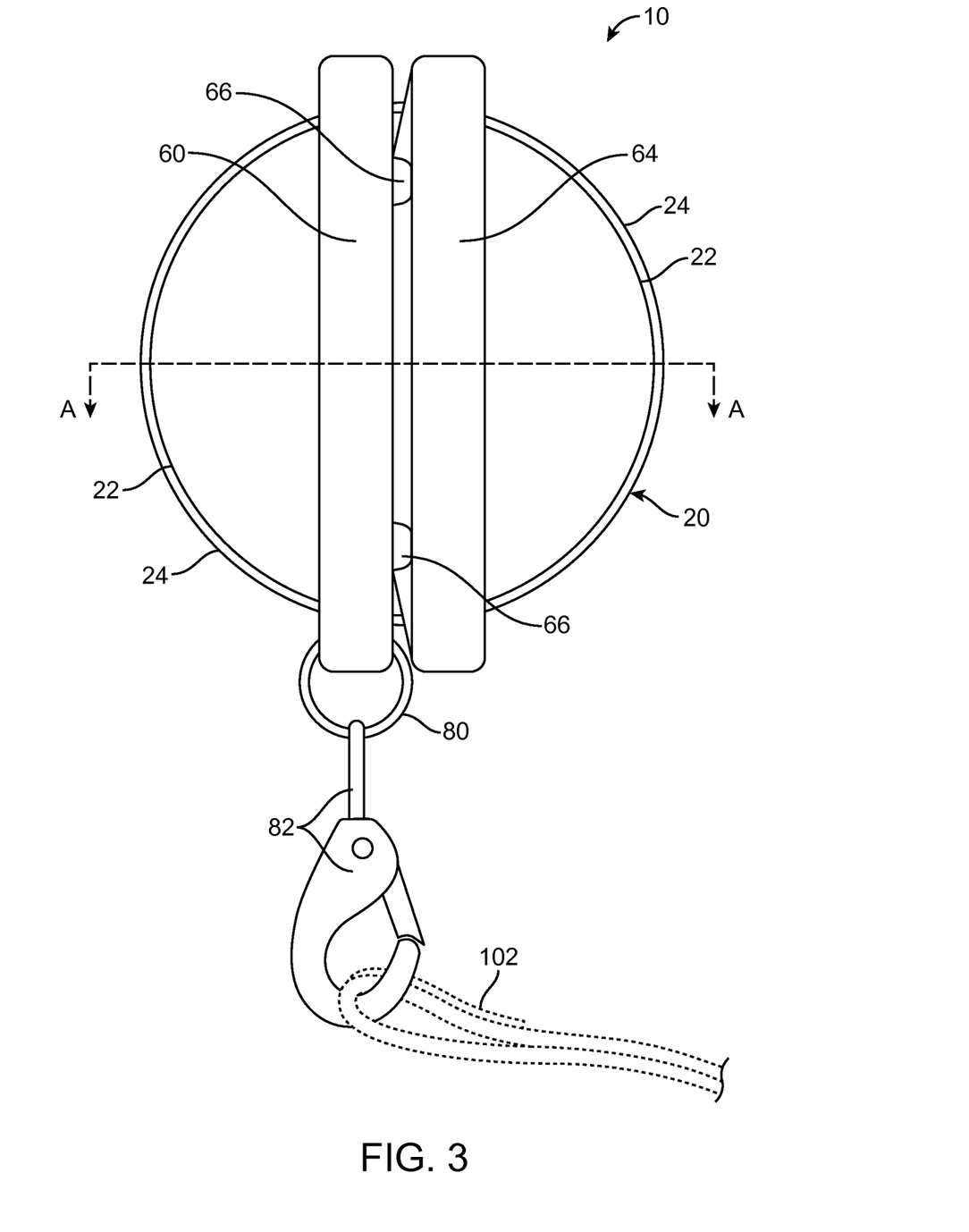
FIG. 3 is a top view of the portable leash anchor 10, according to a preferred embodiment of the present invention.
Figure 4:
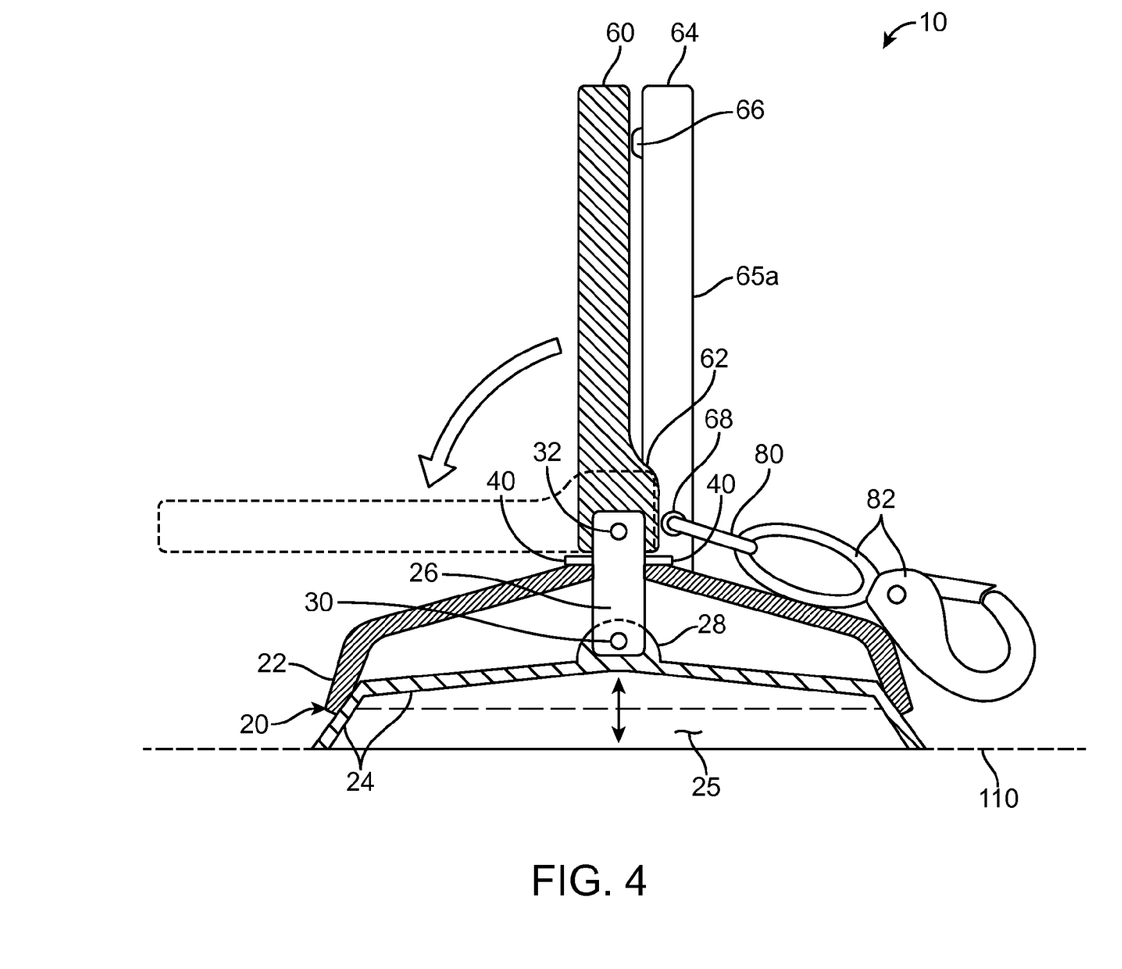
FIG. 4 is a section view of the portable leash anchor 10 taken along section line A-A (see FIG. 4), according to a preferred embodiment of the present invention.
Figure 5:
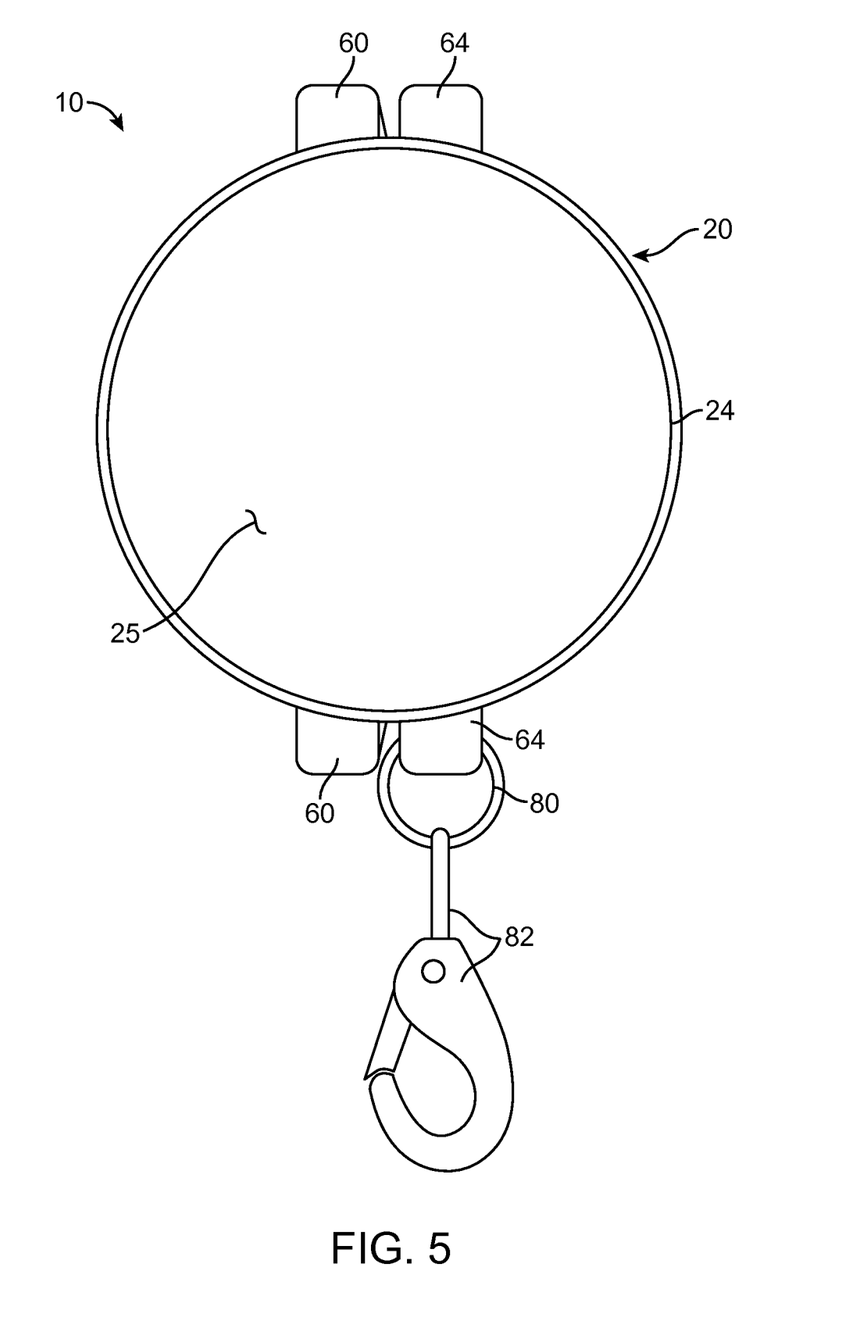
FIG. 5 is a bottom view of the portable leash anchor 10, according to a preferred embodiment of the present invention.
Figure 6:
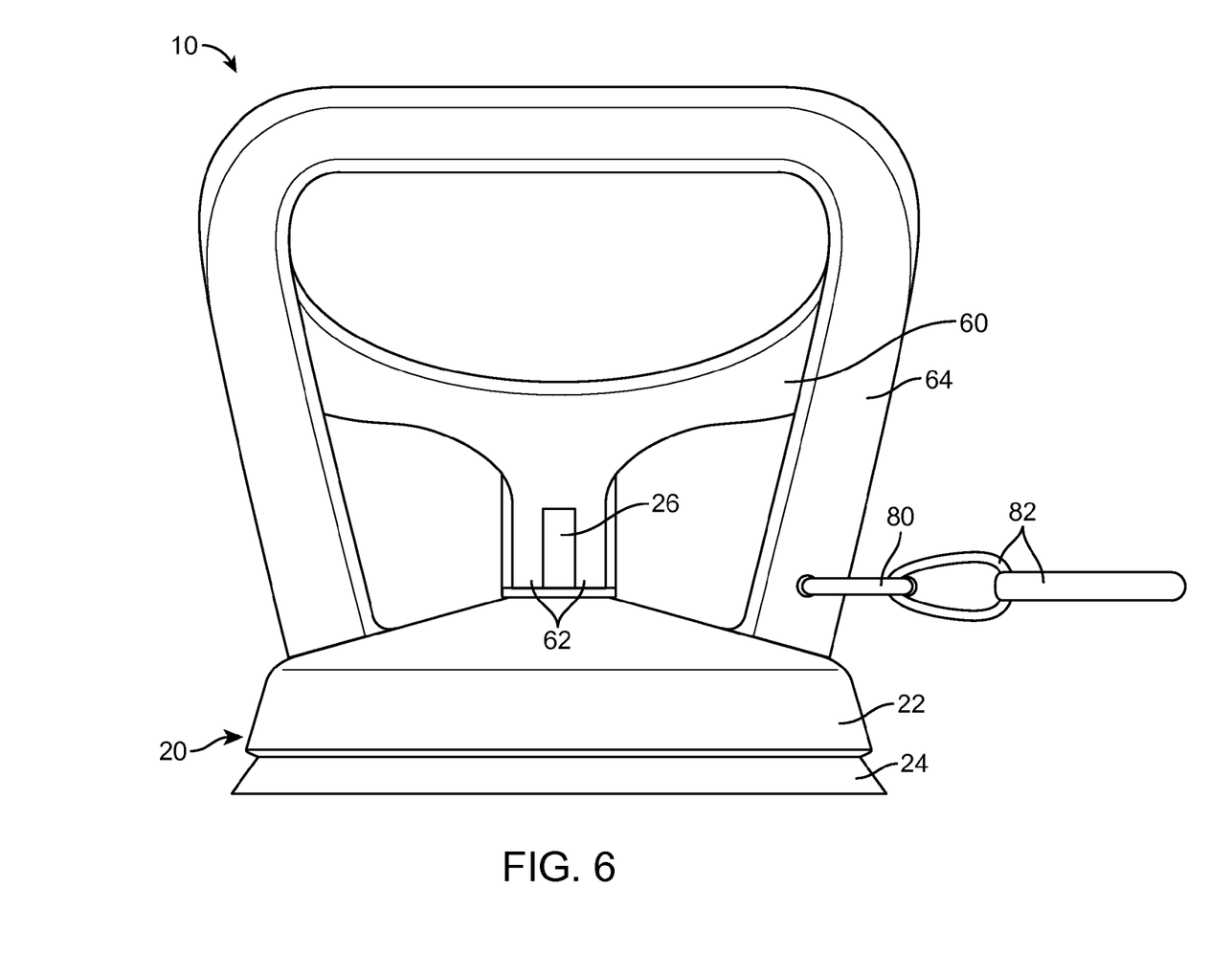
FIG. 6 is a front view of the portable leash anchor 10, according to a preferred embodiment of the present invention.
Figure 7:
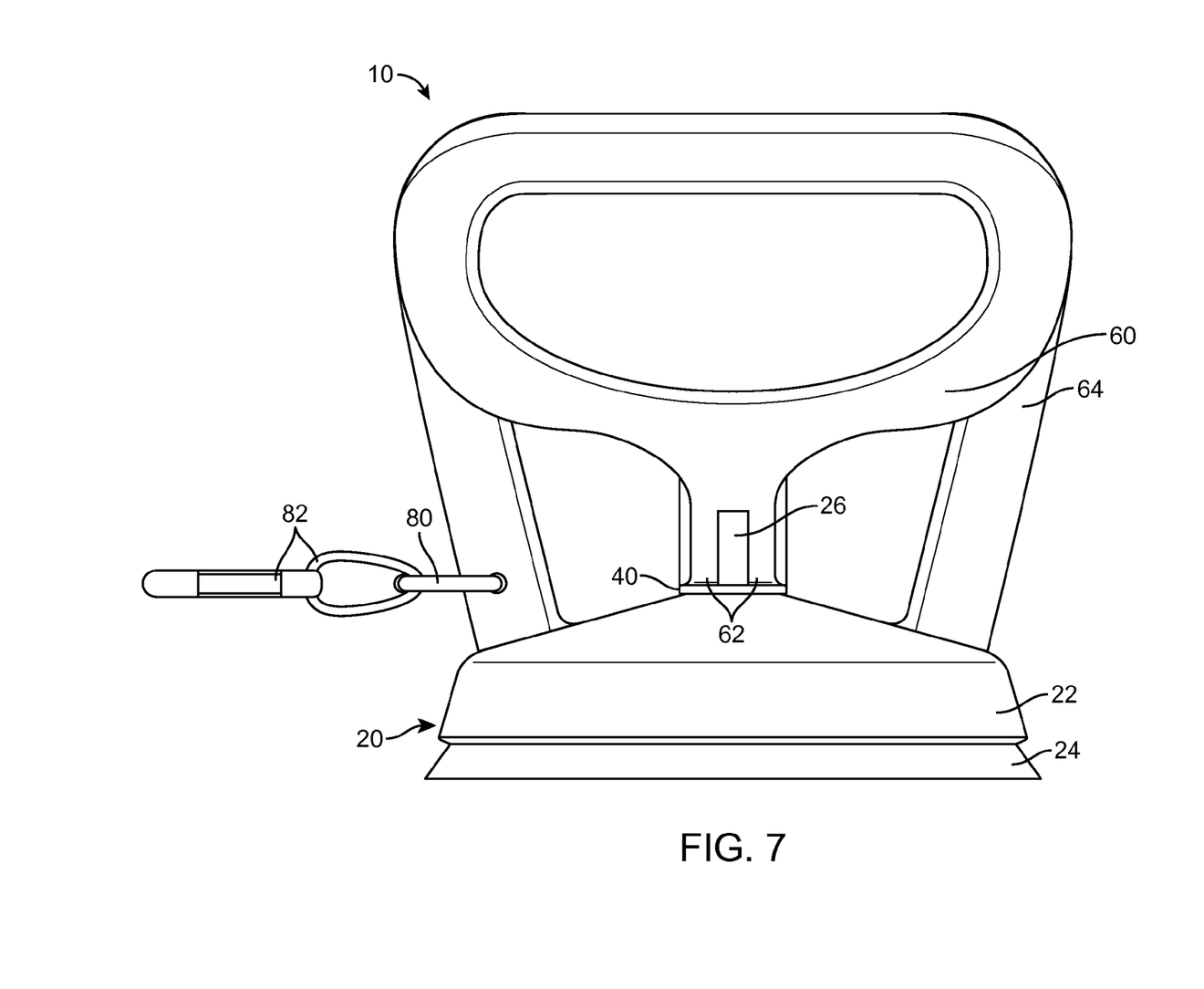
FIG. 7 is a rear view of the portable leash anchor 10, according to a preferred embodiment of the present invention.
Figure 8:
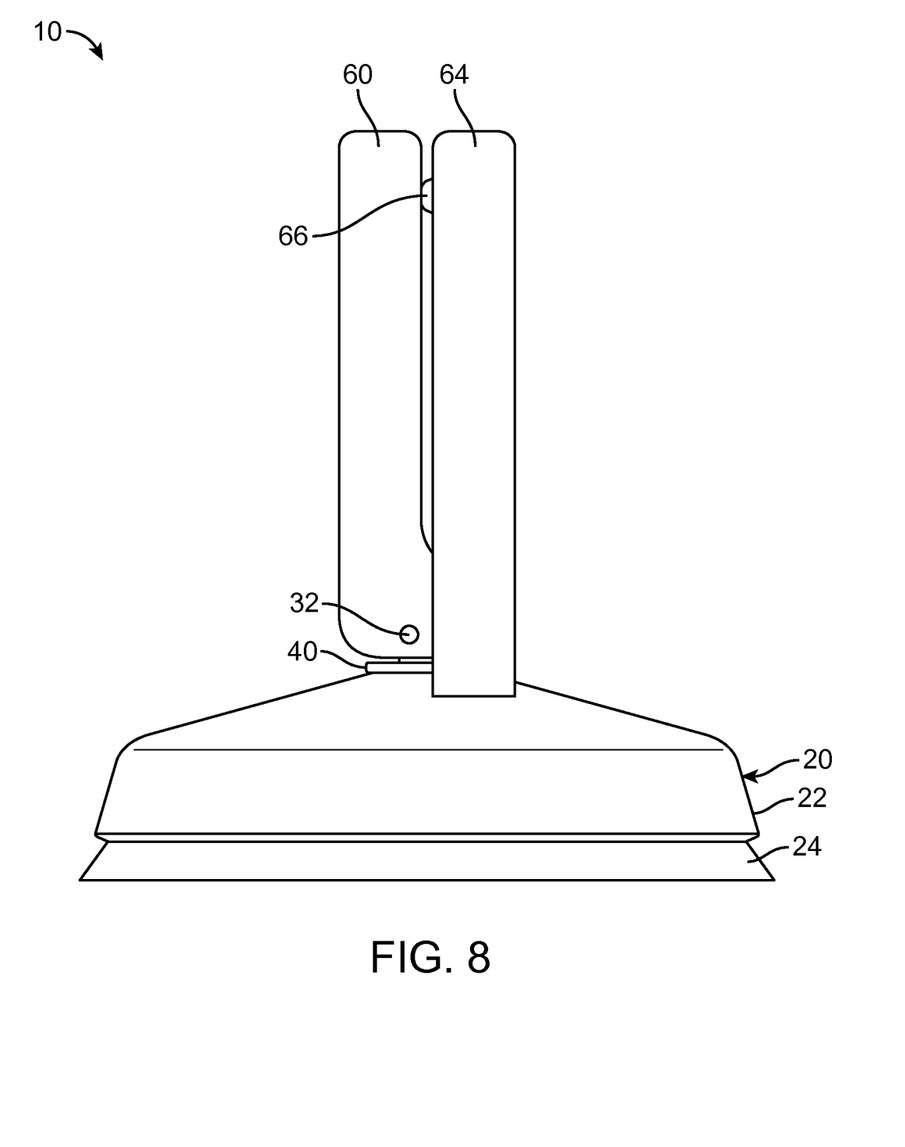
FIG. 8 is a right-side view of the portable leash anchor 10, according to a preferred embodiment of the present invention; and, FIG. 9 is a left-side view of the portable leash anchor 10, according to a preferred embodiment of the present invention.
Figure 9:
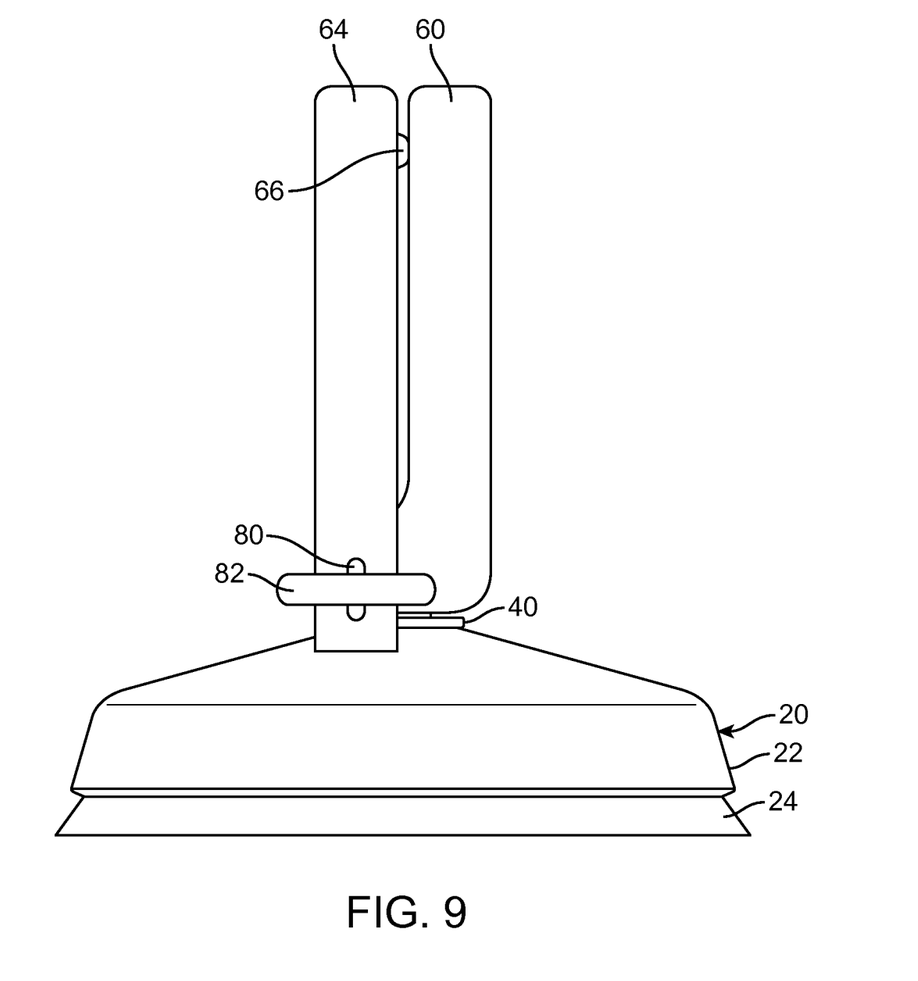

Referring now to FIGS. 2 and 3, a perspective and a section view of the portable leash anchor 10 taken along section line A-A (see FIG. 4), according to a preferred embodiment of the present invention, are disclosed. The device 10 comprises a circular base 22 and is envisioned being introduced in various sizes of approximately three (3) to six (6) inches in diameter depending on a size of a pet 100. The device 10 further comprises a pivoting handle 60 and a stationary handle 64 both of which extend upwardly being parallel to each other attached along a bisecting centerline of said base 22. The handles 60, 64 are of an arcuate shape having open center areas into which a user may insert their fingers to firmly grasp the device 10. The base 22 and handles 60, 64 are envisioned to be made of rugged metal or composite plastic materials.

The pivoting handle 60 provides a means to both release and produce a vacuum zone 25 within the suction cup assembly 20. The pivoting handle 60 is to be rotatingly anchored at a center portion of the base 22 to a linear clevis link portion 26 via a first pin 30. Said clevis link 26 protrudes downwardly through a washer 40 and through the base 22, in turn being rotatingly connected to an integral attachment feature 28 of the subjacent suction cup 24 via a second pin 32. Said attachment feature 28 is envisioned to be integrally-molded into the suction cup 24 at an upper central location. The first pin 30 connects the clevis link 26 to a cam feature portion 62 of the pivoting handle 60 in an offset manner, such that by motioning said pivoting handle 60 from a horizontal position to a vertical position, the cam feature 62 acts against the washer 40 and resultingly lifts the clevis link 26 and the attachment feature 28 at a center location of the suction cup 24, thereby creating a vacuum zone 25 between said suction cup 24 and the smooth surface 110.

The stationary handle 64 comprises a horseshoe-shaped appendage which protrudes perpendicularly upwardly from the base 22 being parallel to the previously described pivoting handle 60 when rotated to the vertical position. Said stationary handle 64 further comprises a first leg 65a and a second leg 65b which are rigidly affixed to a top surface of said base 22 via integral molding, adhesives, fasteners, or the like. The stationary handle 64 provides a stable means to grasp the device 10 as well as allowing the user to grasp both handles 60, 64 coincidentally to aid in pulling the pivoting handle 60 to the vertical position. The stationary handle 64 further comprises a pair of integrally-molded cylinder-shaped spacers 66 along an upper inner surface which maintain a gap between said pivoting 60 and stationary 64 handles to aid a user when separating said handles 60, 64 to rotate the pivoting handle 60 to the horizontal position. Finally, the first leg portion 65a of the stationary handle 64 comprises a drilled or formed aperture portion 68 through a lower portion of said first leg 65a, thereby providing an attachment means to a common circular metal ring 80 which in turn provides an attachment means to a common spring-loaded clasp 82 onto which a leash 102 may be easily fastened.

Referring now to FIGS. 4 through 9, various views of the device 10 including a top view, a bottom view, a front view, a rear view, a right-side view, and a left side view, respectively, according to a preferred embodiment of the present invention, are disclosed.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed and utilized as indicated in FIG. 1.

The method of utilizing the device 10 may be achieved by performing the following steps: procuring a model of the device 10 having a diameter base 22 and suction cup 24 which corresponds to a size and strength of the pet 100; attaching the device 10 to a smooth surface 110 of a structure 105 such as a vehicle, building, or the like by rotating the pivoting handle 60 downwardly against the base 22; grasping the stationary handle portion 64 of the device 10 with one's hand; pressing said device 10 against said smooth surface 110; creating a vacuum zone 25 within the suction cup assembly 20 by rotating the pivoting handle 60 upwardly toward the stationary handle 64 until said pivoting handle 60 contacts the spacer portions 66 of said stationary handle 64; releasing the handle portions 60, 64 of the device 10; affixing a pet's 100 leash 102 onto the clasp 82 in a conventional manner; and, benefiting from establishing a suitable and secure connection point for a pet leash 102 at almost any location, afforded a user of the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A leash anchor, comprising:
   a circular base portion;
   a suction cup assembly along a bottom surface of said base portion, comprising a suction cup with an outer side having a diameter coterminous with a diameter of said bottom base portion and further having an attachment feature at a center location of an inner side;
   a release mechanism attached to an upper surface of said base portion opposite said suction cup assembly, comprising:
      a clevis link having a first end rotatingly attached to said suction cup assembly attachment feature and a second end extending through said base portion;
      a pivoting handle having a cam feature at a lower end rotatingly attached to said clevis link second end and an upper end opposites said lower end;
      a stationary handle, comprising a first leg and a second leg rigidly affixed to said base portion upper surface adjacent to said clevis link at a lower end and a cross member bridging top ends of each of said first and second legs; and,
      a pair of spacers located on said cross member adjacent to said first and said legs on an inner surface thereof; and,
   a release clasp attached to said release mechanism;
   wherein said pivoting and said stationary handle extend outwardly from a bisecting centerline of said base portion upper surface;
   wherein said clevis link is operably controlled by said pivoting handle and operably controls said suction cup assembly;
   wherein said stationary handle provides a stable grasping means for said anchor;
   wherein said pivoting handle provides a selectively operable attaching means to a support structure, such that positioning said pivoting handle in a vertical position attaches said suction cup assembly to said support structure and positioning said pivoting handle in a horizontal position releases said suction cup assembly from said support structure;
   wherein said pivoting handle comprising a matching profile coextensive with said stationary handle when in said vertical position; and,
   wherein said release clasp is adapted to be removably fastened to a leash.

2. The anchor of claim 1, wherein said base portion comprises a size of approximately three to six inches in diameter.

3. The anchor of claim 1, further comprising a washer surrounding an aperture where said clevis link travels through said base portion.

4. The anchor of claim 1, wherein each of said pivoting and stationary handles is an arcuate member having an open center area.

5. The anchor of claim 4, wherein said stationary handle further comprises a general horseshoe-shaped structure.

6. The anchor of claim 1, wherein said release clasp is a ring with a spring-loaded clasp.

7. A leash anchor, comprising:
   a base portion;
   a suction cup assembly along a bottom surface of said base portion, comprising a suction cup with an outer side having a diameter coterminous with a diameter of said bottom base portion and further having an attachment feature at a center location of an inner side;
   a release mechanism attached to an upper surface of said base portion opposite said suction cup assembly, comprising:
      a clevis link having a first end rotatingly attached to said suction cup assembly attachment feature and a second end extending through said base portion;
      a pivoting handle having a cam feature at a lower end rotatingly attached to said clevis link second end and an upper end opposites said lower end;
      a stationary handle, comprising a first leg a second leg rigidly affixed to said base portion upper surface adjacent to said clevis link at a lower end and a cross member bridging top ends of each of said first and second legs; and,
   a pair of spacers located on said cross member adjacent to said first and said legs on an inner surface thereof; and,
   a release clasp attached to said release mechanism;
   wherein said pivoting and said stationary handle extend outwardly from a bisecting centerline of said base portion upper surface;
   wherein said clevis link is operably controlled by said pivoting handle and operably controls said suction cup assembly;
   wherein said stationary handle provides a stable grasping means for said anchor;
   wherein said pivoting handle provides a selectively operable attaching means to a support structure, such that positioning said pivoting handle in a vertical position attaches said suction cup assembly to said support structure and positioning said pivoting handle in a horizontal position releases said suction cup assembly from said support structure;
   wherein said pivoting handle comprising a matching profile coextensive with said stationary handle when in said vertical position; and,
   wherein said release clasp is adapted to be removably fastened to a leash.

8. The anchor of claim 7, wherein said base portion comprises a size of approximately three to six inches in diameter.

9. The anchor of claim 7, further comprising a washer surrounding an aperture where said clevis link travels through said base portion.

10. The anchor of claim 7, wherein each of said pivoting and stationary handles is an arcuate member having an open center area.

11. The anchor of claim 10, wherein said stationary handle further comprises a general horseshoe-shaped structure.

12. The anchor of claim 7, wherein said release clasp is a ring with a spring-loaded clasp.

* * * * *